United States Patent
Motoyama et al.

[11] Patent Number: 6,103,979
[45] Date of Patent: *Aug. 15, 2000

[54] KEYBOARD HAVING PLURALITY OF KEYS THEREIN, EACH KEY ESTABLISHING DIFFERENT ELECTRIC CONTACTS

[75] Inventors: Hideyuki Motoyama; Seiichi Iwasa; Goro Watanabe, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/815,131

[22] Filed: Mar. 10, 1997

Related U.S. Application Data

[63] Continuation of application No. 08/291,898, Aug. 17, 1994, abandoned.

[30] Foreign Application Priority Data

Aug. 26, 1993 [JP] Japan .................................. 5-211973

[51] Int. Cl.⁷ .................................................. H01H 13/70
[52] U.S. Cl. ............................................. 200/4; 200/5 A
[58] Field of Search .............................. 200/4, 5 R, 5 A, 200/6 R, 6 A, 16 R, 16 A, 16 C, 16 D, 18, 339, 553; 400/472, 473, 485, 486, 490

[56] References Cited

U.S. PATENT DOCUMENTS

| | | | |
|---|---|---|---|
| Re. 34,304 | 7/1993 | Goldwasser et al. | 341/22 |
| 4,340,791 | 7/1982 | Sorenson | 200/302 |
| 4,341,934 | 7/1982 | Muller | 200/159 A |
| 4,529,848 | 7/1985 | Cherry | 200/5 A |
| 4,529,849 | 7/1985 | Kamei et al. | 200/5 A |
| 4,716,262 | 12/1987 | Morse | 200/5 A |
| 4,740,661 | 4/1988 | Nishikawa et al. | 200/68.2 |
| 4,786,766 | 11/1988 | Kobayashi | 200/5 A |
| 4,803,316 | 2/1989 | Hayashi et al. | 200/406 |
| 4,896,003 | 1/1990 | Hsieh | 200/6 A |
| 4,924,047 | 5/1990 | Tsuge | 200/553 |
| 4,929,804 | 5/1990 | Kawai et al. | 200/5 A |
| 4,978,823 | 12/1990 | Sato et al. | 200/437 |
| 5,265,716 | 11/1993 | Sawada et al. | 200/5 R |
| 5,283,408 | 2/1994 | Chen | 200/345 |
| 5,288,158 | 2/1994 | Matias | 400/472 |
| 5,293,018 | 3/1994 | Lander | 200/557 |
| 5,329,278 | 7/1994 | Dombroski | 341/20 |
| 5,338,909 | 8/1994 | Stanley et al. | 200/339 |
| 5,357,071 | 10/1994 | Hanaki | 200/557 |
| 5,378,862 | 1/1995 | Tasaka et al. | 200/6 A |
| 5,430,262 | 7/1995 | Matsui et al. | 200/5 A |

FOREIGN PATENT DOCUMENTS

| | | | |
|---|---|---|---|
| 57-4128 | 1/1982 | Japan | H01H 13/70 |
| 63-3065 | 1/1988 | Japan | H01H 23/16 |
| 63-3066 | 1/1988 | Japan | H01H 23/28 |
| 63-60234 | 4/1988 | Japan | H01H 23/02 |
| 63-112724 | 7/1988 | Japan | H01H 23/16 |
| 4-17227 | 1/1992 | Japan | H01H 13/70 |

*Primary Examiner*—Michael A. Friedhofer
*Attorney, Agent, or Firm*—Armstrong, Westerman, Hattori, McLeland & Naughton

[57] ABSTRACT

A keyboard includes a plurality of keys, wherein each key has an elongated shape elongated in a first direction and selectively establishes two different electrical contacts as a result of being pressed appropriately. The plurality of keys are aligned along a second direction different from the first direction. A length in the first direction of each key is longer than a width in the second direction of the key and shorter than twice the width and carries two different key letters present on a front surface thereof at respective ends of the key. Each key establishes one electric contact if a first end of the key is pressed and establishes another electric contact if a second end of the key is pressed. The front surface of each key is parallelogram-shaped and the plurality of keys are arranged so that the key letters present on the keys are arranged in a standard arrangement. The plurality of keys are arranged so that one side of two long parallel sides of a first key face one side of two long parallel sides of a second key, a first side of two short parallel sides of the first key is aligned with a first side of two short parallel sides of the second key, and a second side of the two short parallel sides of the first key is aligned with a second side of the two short parallel sides of the second key.

16 Claims, 13 Drawing Sheets

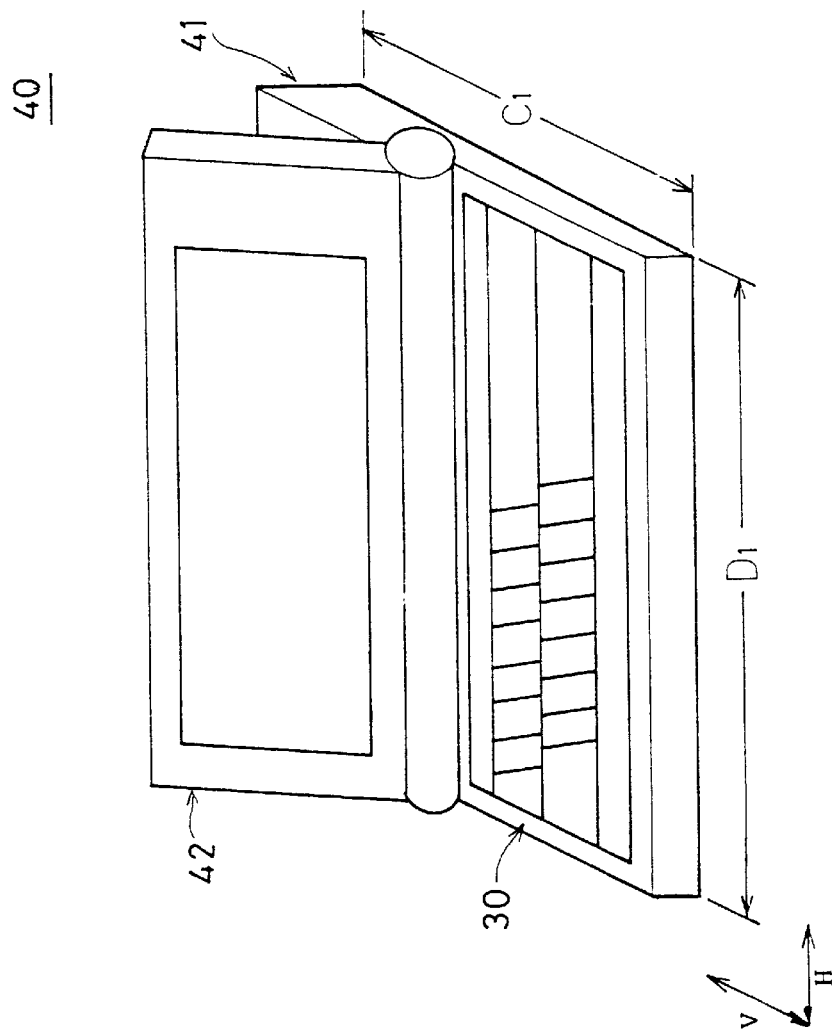

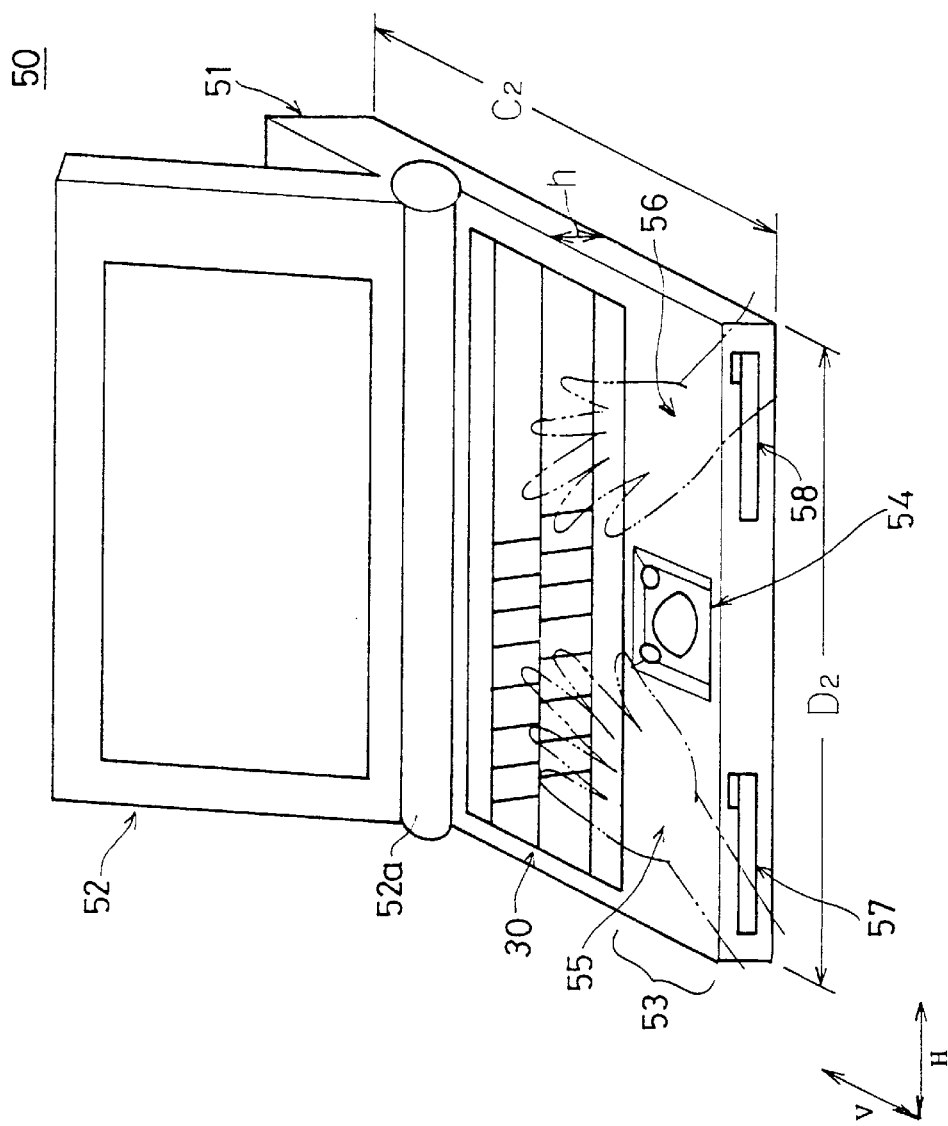

KEYBOARD HAVING PLURALITY OF KEYS THEREIN, EACH KEY ESTABLISHING DIFFERENT ELECTRIC CONTACTS

This application is a continuation of application Ser. No. 08/291,898 filed Aug. 17, 1994, now abandoned.

BACKGROUND OF THE INVENTION

1. Field of the Invention

The present invention relates to keyboards for personal computer apparatuses for example. Personal computer apparatuses, in particular portable personal computer apparatuses such as notebook-type computer apparatuses, are demanded to be reduced in size so as to improve ease in their carriage. Reduction in the size of computer apparatuses requires reduction in size of accompanying keyboards as long as the keyboards can be easily operated by operators. Thus, such keyboards are demanded to be reduced in size while their structures should be kept in a condition where operators can easily operate the keyboards.

2. Related Art

As shown in FIG. 1, a keyboard 10 in an example of keyboards in the related art has four rows of letter keys 11 disposed thereon, each key actuating a relevant switch provided inside the keyboard 10. A number of keys 11 is the same as a number of switches. A shape of a key top of each key 11 is a square having dimensions of a×a. In order to achieve a condition of the keyboard where an operator can easily operate (press) the keys, the dimensions of each key cannot be much reduced. In the example, a is 18 mm and each of vertical and horizontal pitches $P_1$ and $P_2$ is 19 mm, where the term pitch referred to a distance between centers of adjacent key tops.

As shown in FIG. 2, such a keyboard as the keyboard 10 shown in FIG. 1 is incorporated in a notebook-type computer apparatus 20. The computer apparatus 20 includes a body 21 and a display panel 22 as shown in the figure. The display panel 22 is rotatively supported on the body 21 through a hinge mechanism 23 provided therebetween.

In such a keyboard 10 in the related art, the size of each key top and the pitch between each adjacent key tops are sufficiently large in order to provide ease in operator's operation thereof as described above. Further, the number of keys is required to be the same as the number of switches contained in the keyboard 10. Thus, in the example, total dimensions of an area in the keyboard required to dispose all the 5 rows of keys including the 4 rows of letter keys 11 amount to approximately 100 mm (vertical dimension A shown in FIG. 1)×approximately 300 mm (horizontal dimension B shown in FIG. 1). The size of the computer apparatus 20 shown in FIG. 2 containing the keyboard 10 is approximately 260 mm (vertical dimension C shown in FIG. 2)×approximately 300 mm (horizontal dimension D shown in FIG. 2), the same as the A-4 size.

The size a×a of the key top of each key 11 and the pitch $P_1$ and $P_2$ between each adjacent keys 11 are assumed to be reduced for the purpose of miniaturizing the overall dimensions of the keyboard 10. However, a keyboard structure resulting from such an assumption may cause the operator's fingers when pressing adjacent keys to collide with one another, thus degrading ease in operator's operation of the keys. Such structure also may cause the operator to erroneously press a key different from a key which the operator has attempted to press or to erroneously press a plurality of keys with a single finger. Generally speaking, the horizontal pitch $P_2$ shown in FIG. 1 between adjacent key tops is preferably more than 15 mm, for example.

SUMMARY OF THE INVENTION

An object of the present invention is to provide a miniaturized keyboard while ease in operator's operation of keys thereof is kept.

In order to achieve the object of the present invention, a keyboard according to the present invention uses a plurality of keys, each key having an elongated shape elongated in a first direction. Each key has a width in a second direction different from the first direction. A length in the first direction of each key is shorter than twice the width. Each key can selectively establish two different switches provided for each key contained in the keyboard. The plurality of keys are in the keyboard so that the keys are aligned along the second direction. The first direction nears a vertical direction if the second direction is assumed to be a horizontal direction of the keyboard. A keyboard is assumed to be produced using the above structure according to the present invention, the keyboard having a number of switches the same as a number of switches contained in the keyboard 10 in the related art shown in FIG. 1. Dimensions of the thus produced keyboard can be reduced in comparison to the dimensions of the keyboard 10. As a result, a notebook-type personal computer apparatus, for example, can be miniaturized. Further, another information inputting means can be added to a computer apparatus by using a space created as a result of reducing a size of the keyboard so that the computer apparatus is improved in its information inputting capability. Further, the above-described structure of the keyboard according to the present invention may reduce the above vertical direction of the keyboard. Thus, an operator can easily hit keys disposed on a top row of a key arrangement. Such a top row of keys is difficult for the operator to hit in the keyboard in the related art such as that shown in FIG. 1.

Further, since each of pitches between adjacent keys such as $P_1$ and $P_2$ shown in FIG. 1 is preferably set to be approximately 15 mm through 19 mm, the operator is not required to make an effort to move the operator's fingers near one another to press the adjacent keys. Moving the fingers near one another may cause the fingers to collide with one another degrading ease in the operator's operation of the keys. The above key arrangement according to the present invention may maintain the ease in the operator's operation of the keys.

Further, each key of the plurality of keys preferably has a fulcrum to support the key so as to enable the key tilting about the fulcrum at a center of the key. Such a structure allows each key to tilt if the operator properly presses either end of the key and prevents simultaneous operations of the two switches belonging to each key even if the operator erroneously presses the center of the key. Thus, an erroneous establishment of the two switches belonging to each key can be surely avoided. Further, if the operator presses a key in a manner in which a finger slides on a key-top surface of the key to make the key tilt, the operator feels as if a key-pressing stroke depth of the key is longer than an actual stoke depth of the key. The term 'stroke depth' is a distance for which the key can move when the operator presses the key. Such feeling improves good key-operation feeling.

Further, each key preferably has a returning spring such as an elastic member to cause a key top of the key to return to lie along a predetermined direction such as the horizontal direction after the operator's pressing force once applied to the key to rotate it has been removed.

Further, each key preferably has a key top having two different letters printed thereon at two sides along a longitudinal axis of the key top, the key top being parallelogram-shaped as shown in FIG. 3 (see a key top 31). Such a structure enables a reduced number of keys to represent an arrangement of letters present on the key tops, the arrangement of letters similar to the arrangement of letters present on the key tops of keys 11 in the keyboard in the related art shown in FIG. 1. See FIGS. 1 and 3 comparatively. Thus, the key arrangement according to the present invention such as that shown in FIG. 3 enables formation of the JIS (Japanese Industrial Standard) arrangement of letters while an area required to dispose the keys on the keyboard can be made three quarters (¾) of a corresponding area required in the keyboard in the related art such as that shown in FIG. 1.

Further, the key top of each key preferably has a shape such that a top surface at either side of the key top lies along a predetermined direction after a side of the key top has been pressed so as to be lowered, the predetermined direction being a direction along which the top surface of the keyboard extends. Such a shape of each key enables the operator using the operator's finger to sense that the key has been properly pressed by sensing that a surface of a key top lies along the predetermined direction. Thus, good key-operation feeling can be improved.

Further, each key preferably has rod-like actuating members mounted on the key projecting from a bottom surface of the key and each actuating member lies perpendicular to a top surface of a relevant switch after the operator presses a relevant side of the key. Thus, a projecting free end of the actuating member presses the switch with its longitudinal axis perpendicular to the top surface of the switch to actuate the switch to establish a relevant electric contact. Thus, the actuating member is not subject to bending stress when the key is pressed to cause the actuator member to press the switch. As a result, a life time of the actuator member can be elongated.

Further, each key preferably has a rubber spring acting as the above-mentioned returning spring to provide a clicking feeling to the operator when the operator presses the key. Thus, the good key-operation feeling is improved. Further, a rubber-made projection is formed on the rubber spring and acts as the above-mentioned actuating member to prevent a relevant switch from being damaged when the switch is pressed by the projecting free end of the projection.

Further, each key may have a single compression coil spring acting as the above-mentioned returning spring. Since the single compression coil spring acts to cause the key top to return to lie along the predetermined direction, the key top accurately returns to lie along the predetermined direction in comparison to a structure in which two compression coil springs are respectively used for bearing two ends of each key. Using the two coil springs for the single key may prevent the key top from accurately returning to lie along the predetermined direction due to difference in the two coils which may arise during manufacturing such as in their shapes, properties, or the like. Further, a number of parts required to form the keyboard can be reduced.

Other objects and further features of the present invention will become more apparent from the following detailed description when read in conjunction with the accompanying drawings.

BRIEF DESCRIPTION OF THE DRAWINGS

FIG. 4 shows a perspective view of a notebook-type computer apparatus in a first embodiment of an apparatus incorporating therein the keyboard shown in FIG. 3;

FIG. 5 shows a perspective view of a notebook-type computer apparatus in a second embodiment of an apparatus incorporating therein the keyboard shown in FIG. 3;

DESCRIPTION OF THE PREFERRED EMBODIMENTS

Figure 3:
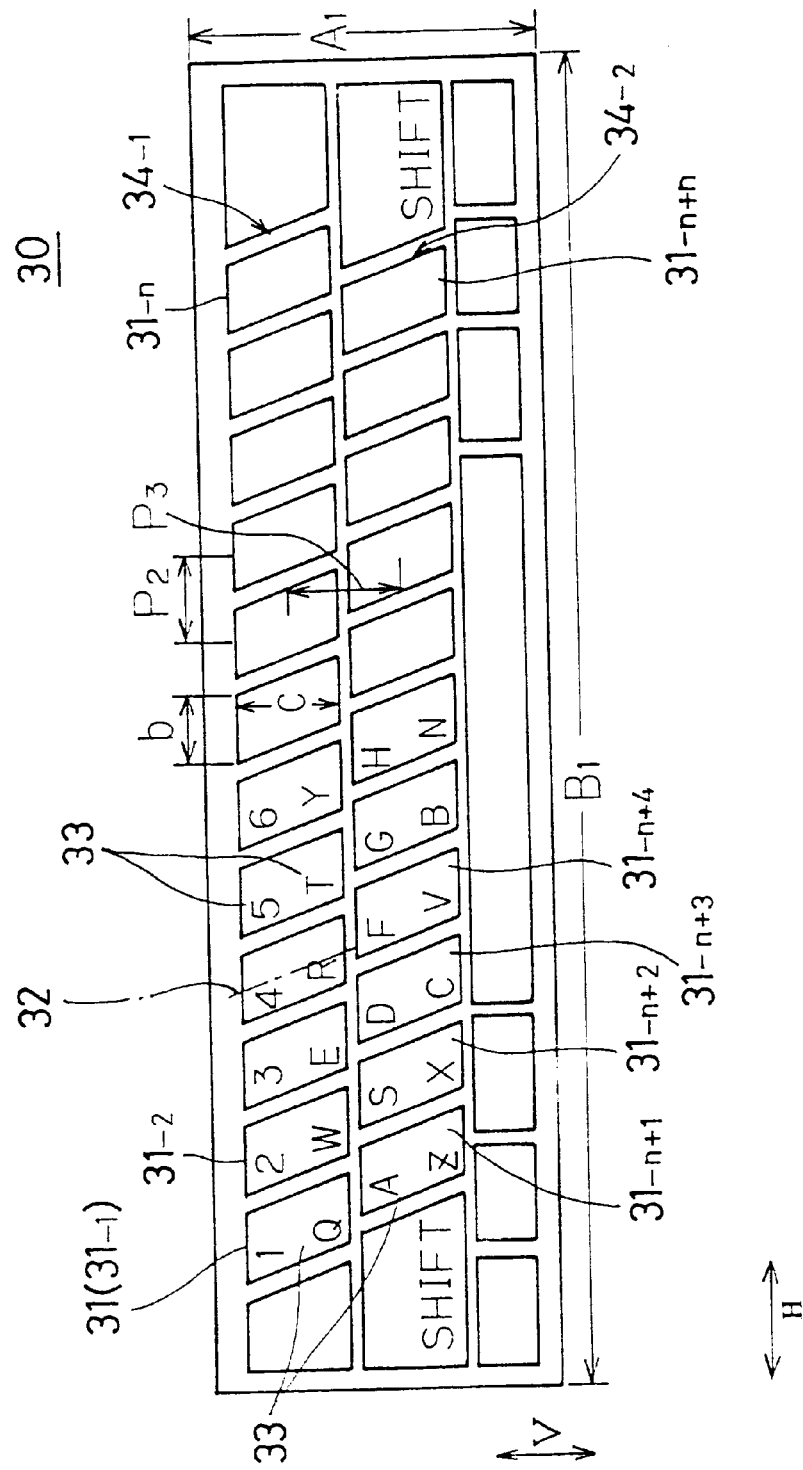
FIG. 3 shows a plan view of a keyboard in one embodiment of the present invention.

With reference to FIG. 3, a keyboard 30 in one embodiment of the present invention will now be described. As shown in the figure, the keyboard 30 has two rows of letter keys 31. A first row $34_{-1}$ of keys are n keys $31_{-1}$ through $31_{-n}$ and second row $34_{-2}$ of keys are n keys $31_{-n+1}$ through $31_{-n+n}$.

A top surface of each letter key 31 is parallelogram-shaped as shown in FIG. 3 having a size, a height c of approximately 25 mm×a length b of either a top or bottom side (hereinafter referred to as a width b) of approximately 18 mm. Thus, the height c, approximately ⅘ (=2·⅔) of the width b, is longer than the width b and shorter than twice the width b. A reason why a parallelogram shape is applied to the top surface of each letter key 31 is as follows: Each parallelogram-shaped key carries two letters ('W' and 'S', for example) thereon. These two letters are carried by two keys, respectively, in a conventional keyboard such as the keyboard 10 shown in FIG. 1 to be pressed by a same finger (the little finger in the example) according to conventional finger usage for such a conventional keyboard. As a result of such a parallelogram-shape application, operator's finger usage (such as that in which the little finger is used for the alphabetical letters 'Q', 'A', 'Z', . . . , the third finger is used for 'W', 'S', 'X', . . . , for example) for operating the letter keys 31 can be approximately identical to that for operating conventional letter keys such as those 11 shown in FIG. 1. Further, a membrane sheet 70 having membrane switches 71 and 72 therein shown in FIG. 7 for the keyboard 30 shown in FIG. 3 can be obtained as a result of simply modifying a corresponding membrane sheet having been designed for the conventional keyboard such as the keyboard 10. The simple modification is such that a dimension of the membrane sheet is reduced in the vertical direction V. However, the shape of the top surface of each key 31 is not limited to be a parallelogram and may be a rectangle.

The top surface of each letter key 31 is disposed on the keyboard 30 so that a longitudinal axis 32 of the top surface lies along a direction near a vertical direction V shown in FIG. 3. A pitch $P_2$ between adjacent letter keys along a horizontal direction H is approximately 19 mm, the same as the pitch $P_2$ in the keyboard 10 in the related art shown in FIG. 1. A pitch $P_3$ between adjacent letter keys along the vertical direction V is approximately 26 mm.

Figure 1:
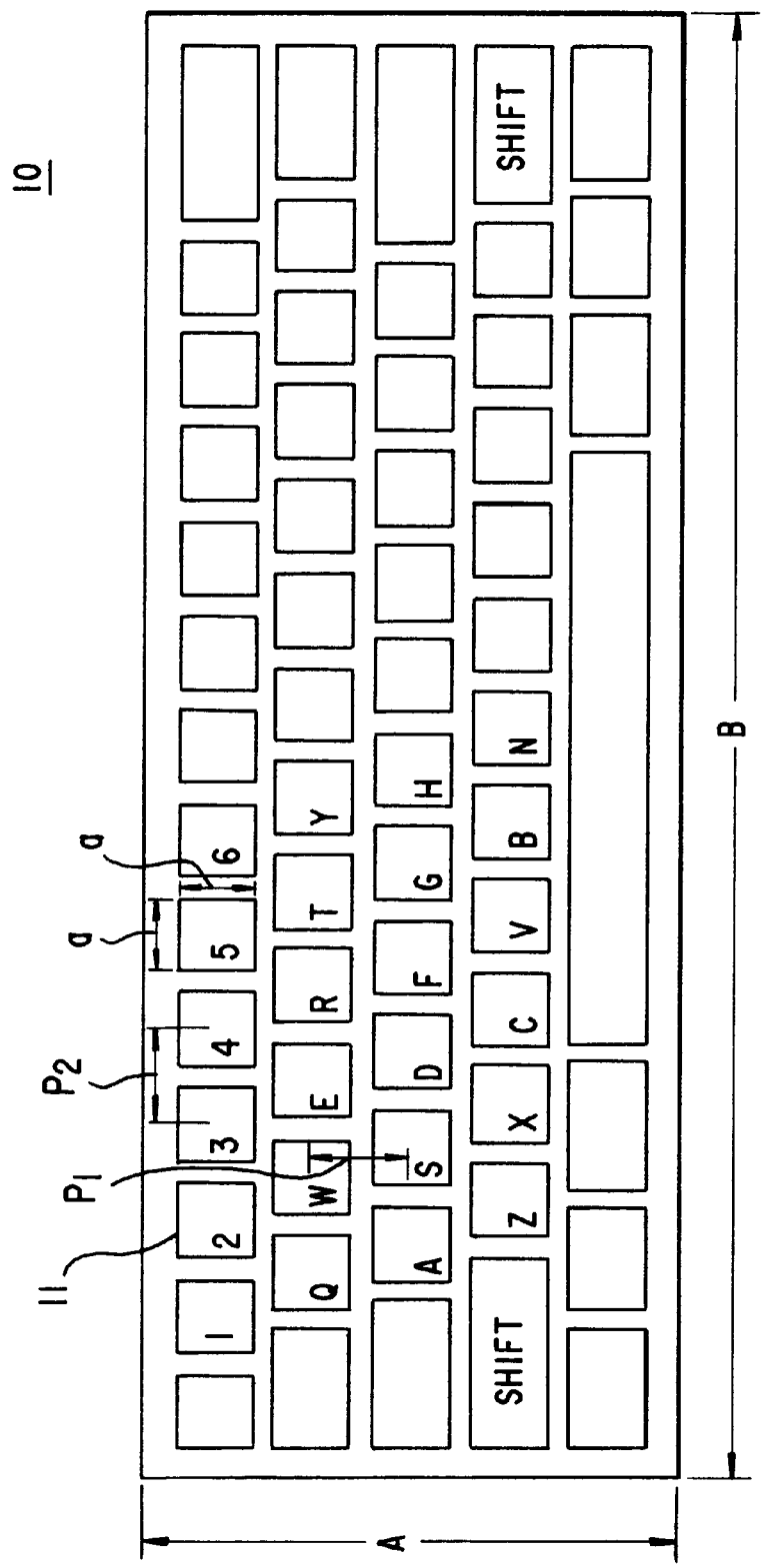
FIG. 1 shows a plan view of a keyboard in the related art.

As shown in FIG. 3, the top surface of each letter key 31 has two different letters 33 printed thereon at two ends along the longitudinal axis 32 thereof. Each letter key 31 has two switches underneath the key 31 and an operator may selectively press either end of the top surface of any key so that a relevant switch of the two switches is activated to establish a relevant electric contact. Such a structure, in which a single letter key provides for two different letters and may actuate two different relevant switches, reduces a number of letter keys inputting the same number of letters. Actually, with comparative reference to FIGS. 1 and 3, a similar letter arrangement can be realized in the structure according to the present invention such as that shown in FIG. 3 by the number (2 rows) of keys half a number (4 rows) of keys required in the structure in the related art such as that shown in FIG. 1. As a result, in the embodiment shown in FIG. 3, a horizontal dimension $B_1$ of the keyboard 30 is approximately 300 mm, the same as the horizontal dimension B of the keyboard 10, and a vertical dimension $A_1$ is approximately 75 mm, shorter by approximately 25 mm than the vertical dimension A of the keyboard 10. Thus, miniaturization of the keyboard, in particular reduction in the vertical dimension thereof, can be achieved. As shown in FIGS. 1 and 3 comparatively, an arrangement of the letters 33 printed on the letter keys 31 is made in accordance with the JIS arrangement in the keyboard 30, the same as the letter arrangement in the keyboard 10.

Figure 2:
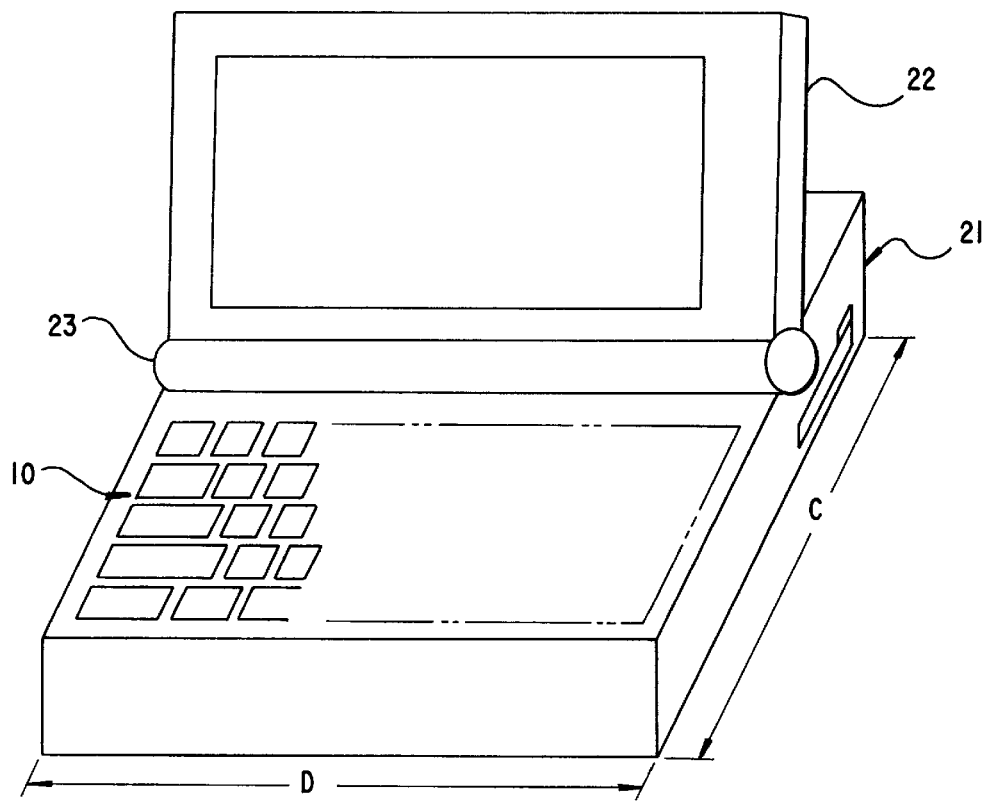
FIG. 2 shows a perspective view of a notebook-type computer apparatus incorporating therein the keyboard shown in FIG. 1.

With reference to FIG. 4, a notebook-type computer apparatus 40 in a first embodiment of an apparatus incorporating therein the thus miniaturized keyboard 30 will be described. As shown in the figure, the computer apparatus 40 includes a body 41 and a display panel 42 mounted on the body 41 rotatively so that the display panel 42 can be supported on the body 41 as shown in FIG. 4. The body 41 contains the keyboard 30 in a front portion thereof. The computer apparatus 40 has a size, a horizontal dimension $D_1$ of approximately 300 mm×a vertical dimension $C_1$ of approximately 235 mm. The horizontal dimension $D_1$ is the same as the horizontal dimension D of the computer apparatus 20 shown in FIG. 2 containing the keyboard 10 in the related art. However, the vertical dimension $C_1$ is approximately 25 mm shorter than the vertical dimension C of the computer apparatus 20. Thus, miniaturization of the computer apparatus containing the keyboard, in particular, in the vertical dimension thereof can be achieved due to the miniaturization of the keyboard.

With reference to FIG. 5, a notebook-type computer apparatus 50 in a second embodiment of an apparatus incorporating therein the keyboard 30 shown in FIG. 3 will now be described. The computer apparatus 50 has a size, a vertical dimension $C_2$ of approximately 260 mm×a horizontal dimension $D_2$ of approximately 300 mm of, approximately the same as the size of the computer 20 in the related art shown in FIG. 2. A display panel 52 is mounted on a body 51 at a position corresponding to a position at which the display panel 22 is mounted on the body 21 in the computer 20 shown in FIG. 2. See FIGS. 6A and 6B for comparison. A battery 59b can be incorporated in a space 59a located in the body 51 at a rear of a hinge mechanism 52a rotatively supporting the display panel 52 on the body 51. Such a structure is similar to a structure in the computer 20 shown in FIG. 6A incorporating therein a similar battery 29b at a rear of a hinge mechanism 22a. The space 59a can alternatively be used as an extension box. A connector 59c is also incorporated at a bottomrear of the hinge mechanism 52a in the body 51 similar to a connector 29c incorporated in the body 21 of the computer 20 in the related art.

Figures 6A, 6B:
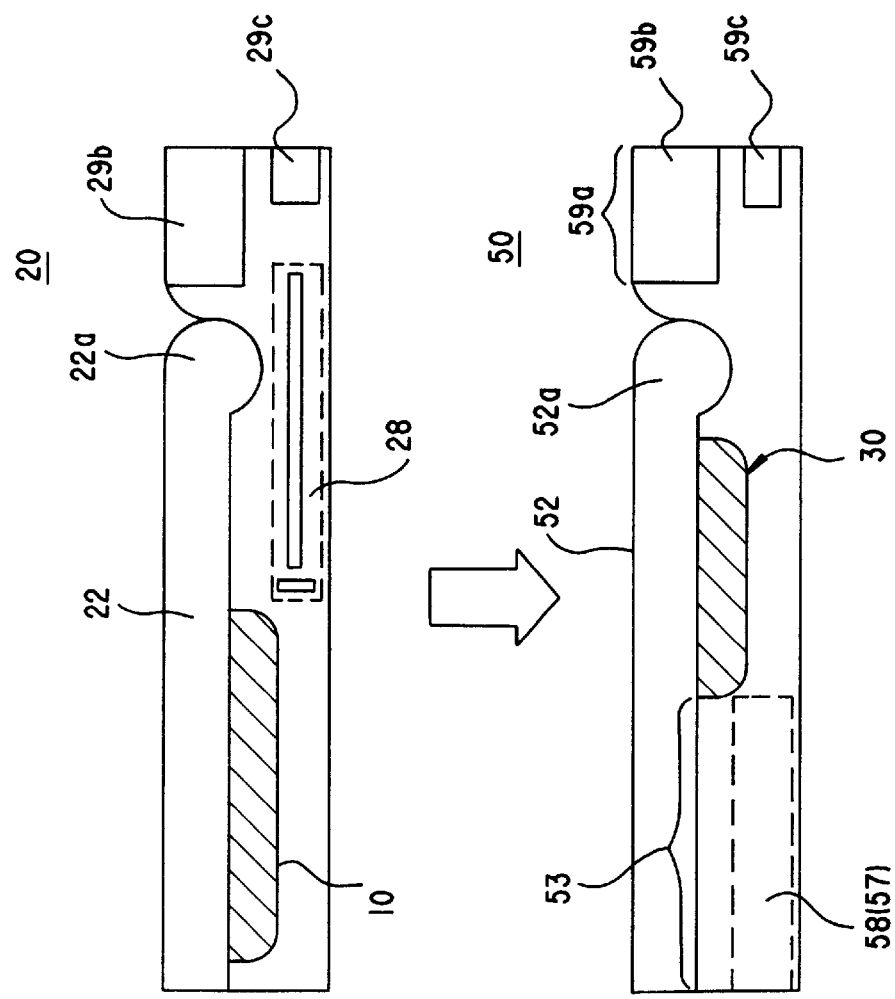
FIGS. 6A and 6B show comparative side elevational views of the computer apparatus incorporating therein the keyboard in the related art shown in FIG. 2 and the computer apparatus incorporating therein the keyboard in the embodiment of the present invention shown in FIG. 5.

The keyboard 30 is disposed at a front of the hinge mechanism 52a. As shown in FIG. 6B, although the computer 50 has substantially the same size as the size of the computer 20 in the related art, both the keyboard 30 and magnetic disk drive devices 58 and 57 can be disposed in front of the hinge mechanism 52a. As shown in FIG. 6A, the keyboard 10 can be disposed in front of the hinge mechanism 22a but a magnetic disk drive device 28 lies from the front to the rear of the hinge mechanism 22a in the body 21 of the computer 20 in the related art. Either in the computer 20 or in the computer 50, a length of a portion of the body 21 or 51 extending in front of the hinge mechanism 22a or 52a is substantially the same as a length of the display panel 22 or 52 so that a front end of the body 21 or 51 is aligned with a top end of the display panel 22 or 52, at the left end in FIGS. 6A and 6B, after the display panel has been reclined on the body as shown in FIGS. 6A and 6B.

As shown in FIGS. 5 and 6B, a space 53 having a vertical length of approximately 90 mm is created in front of the keyboard 30 on the body 51, the magnetic disk drive devices 57 and 58 being present underneath the space 53. A middle portion of the space 53 is used to provide an area for mounting a track ball 54 serving as a pointing device. Portions located at two sides of the area for the track ball 54 in the space 53 are used as palm rests 55 and 56. As shown in FIG. 5, the magnetic disk drive devices 57 and 58 are present immediately below the palm rests 55 and 56. Such an arrangement uses the space 53 in the body 51 effectively and efficiently, since a relatively small height h of the body 51 shown in FIG. 5 is sufficient to incorporate therein the magnetic disk drive devices 57 and 58, and ease in the operator's operation of the keyboard 30 is improved by providing palm rests 55 and 56. Further, the track ball 54 is provided to improve an information inputting capability of the computer apparatus 50.

Figure 7:
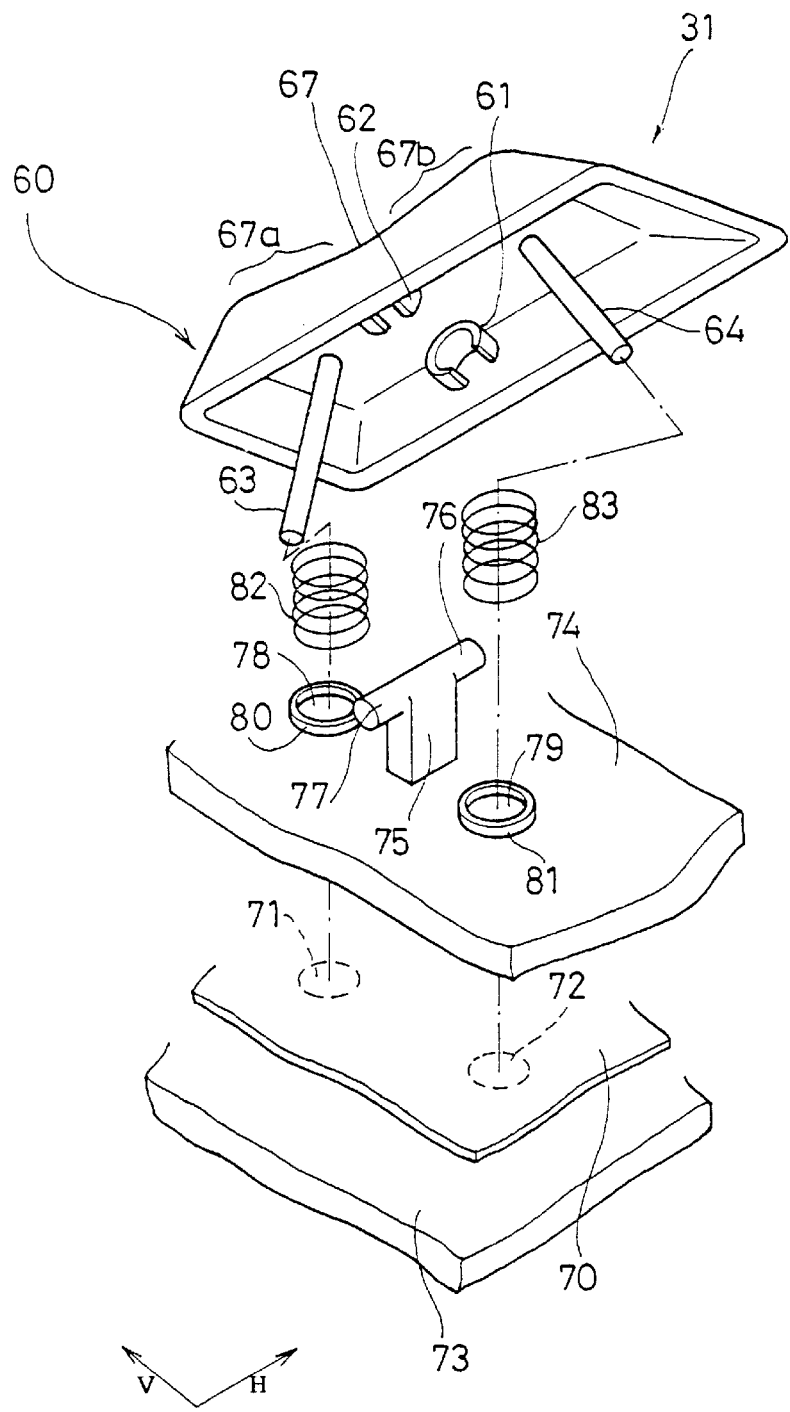
FIG. 7 shows an enlarged exploded perspective view of a key mechanism used in the keyboard shown in FIG. 3.

A structure of each letter key 31 and accompanying elements provided in the keyboard 30 will now be described with reference to FIGS. 7, 8, 9, and 10. Each key 31 is referred to as a key 60 in the particular description. As shown in FIG. 7, each key 60 has a roof-like shape. A pair of C-letter-like hooks 61 and 62 are mounted on a rear surface of the key 60 and a pair of rod-like actuators 63 and 64 projecting from the rear surface of the key 60. Projecting ends of the actuators 63 and 64 are rounded as shown in FIG. 9 to prevent the ends from damaging the above-mentioned membrane switches 71 and 72.

Figure 8:
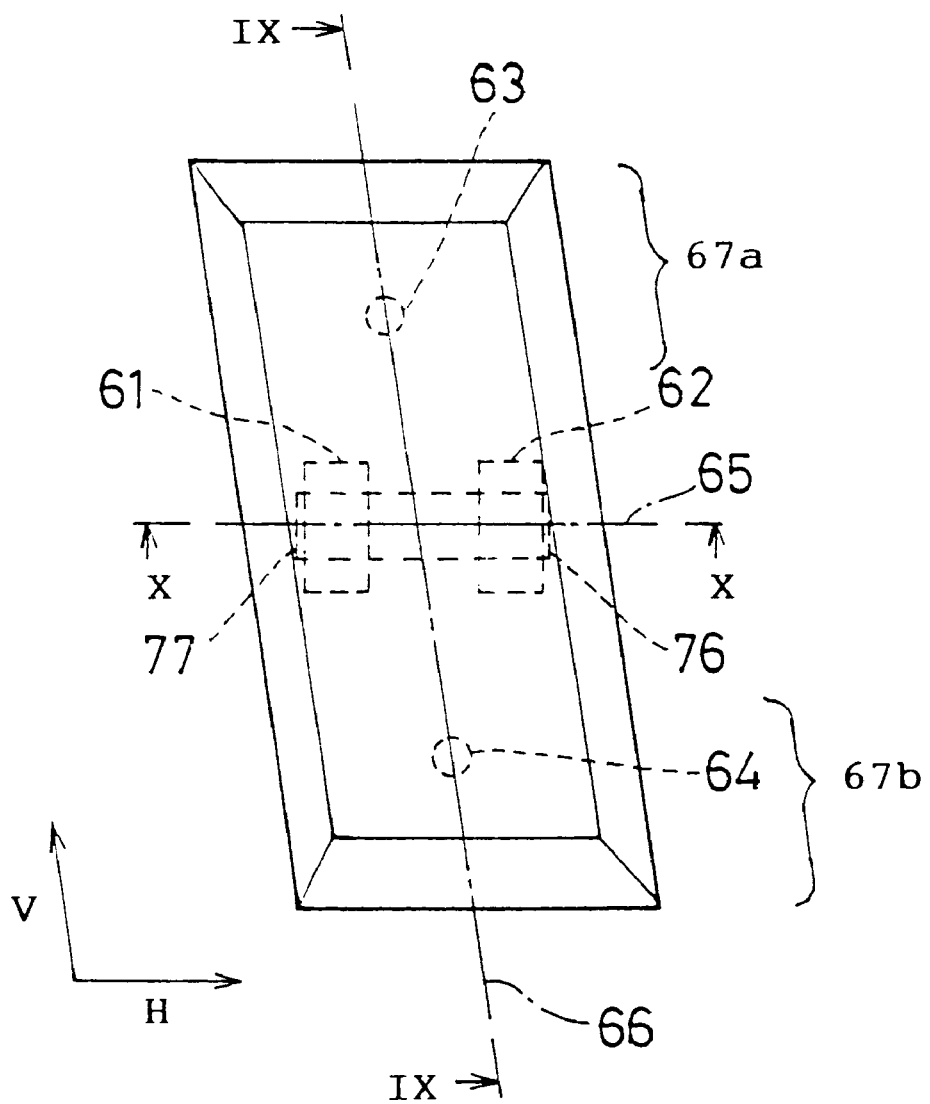
FIG. 8 shows a plan view of a top surface of a key used in the keyboard shown in FIG. 3.

A horizontally extending center line 65 shown in FIG. 8, referred to as a center line of the key 31, lies in parallel to either a top or a bottom side of a parallelogram defining the plan outline of the key 60. A vertically extending center line 66 shown in FIG. 8 also referred to as a center line of the key 31, lies in parallel to either a left or a right side of the parallelogram. As shown in FIG. 8, the hooks 61 and 62 are mounted on the horizontally extending center line 65. The hooks 61 and 62 are mounted symmetrically with respect to a certain point formed as a result of an intersection of the vertically and horizontally extending center lines 65 and 66. The symmetry with respect to the certain point is referred to as identical to a situation in which a first figure overlaps with a second figure when the first figure is rotated about the point by 180°. The actuators 63 and 64 are mounted on the vertically extending center line 66 symmetrically with respect to the above certain point.

Figure 9:
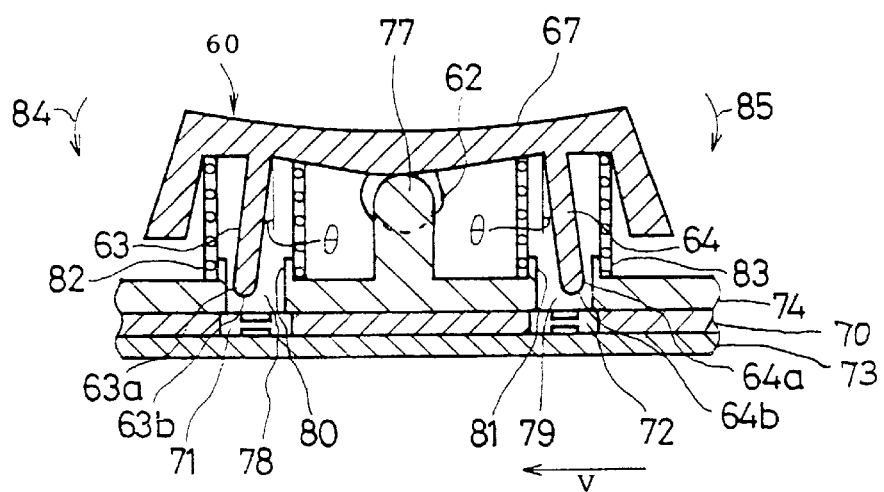
FIG. 9 shows a side elevational sectional view of the key mechanism shown in FIG. 7 taken along a line IX—IX shown in FIG. 8.
Figure 10:
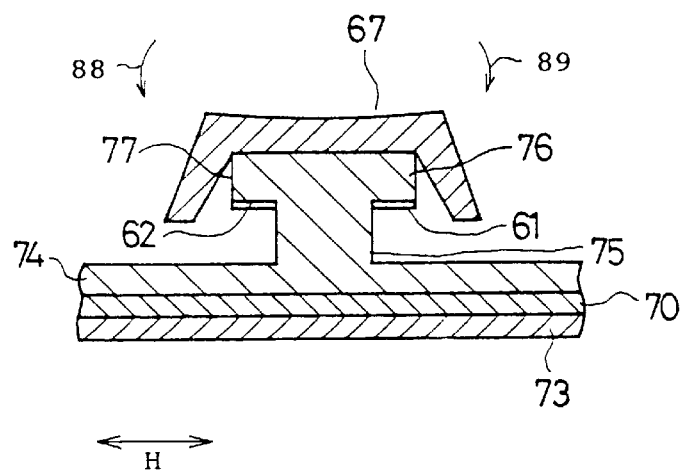
FIG. 10 shows a side elevational sectional view of the key mechanism shown in FIG. 7 taken along a line X—X shown in FIG. 8.

As shown in FIGS. 9 and 10, a top surface 67 of key 60 is shaped such that a height of a position decreases as the position moves from any side of four sides of the parallelogram to a middle on the top surface 67. That is, the top surface 67 is concave with a lowest center. As shown in FIG. 8, end portions of the top surface 67 along a direction parallel to the generally vertically extending center line 66 of the key 60 are referred to as a top-surface portions 67a and 67b.

As shown in FIG. 10, each key 31 (60) is mounted on a column 75 projecting upward from a top housing 74 of the keyboard 30. The key 60 is rotatively supported on the column 75 through shaft portions 76 and 77 and hooks 61 and 62, the shaft portions 76 and 77 horizontally oppositely extending from a top of the column 75. The hooks 61 and 62 are fitted outside the shaft portions 76 and 77 so as to allow the key 60 to be rotated along directions 84 and 85 shown in FIG. 9 about the shaft portions 76 and 77. The abovementioned membrane sheet 70 is sandwiched between the housing 74 and a supporting panel 73 supporting the membrane sheet 70 and the top housing 74. The membrane sheet 70 contains the membrane switches 71 and 72 located at positions matching positions of the actuators 63 and 64. Openings 78 and 79 are formed in the housing 74 with collars 80 and 81 projecting from circular edges of the openings 78 and 79. The actuators 63 and 64 are inserted into the openings 78 and 79 allowing the actuators 63 and 64 to press the membrane switches 71 and 72 through the openings 78 and 79.

Two compression coil springs 82 and 83 for causing the key 60 to return to an original state shown in FIG. 9 are fitted outside the collars 80 and 81 to project upward from the housing 74. Top ends of the coil springs 82 and 83 support the rear surface of the key 60 and each coil of coils of the coil springs 82 and 83 surrounds a respective one of the actuators 63 and 64 so that each of the actuators 63 and 64 is present inside a respective one of the coil springs 82 and 83.

The key 60 is mounted on the column 75 after the coil springs 82 and 83 have been put on the housing 74, in a way in which an assembler presses the key 60 onto the column 75 with the hooks 61 and 62 to be pressed onto the shaft portions 76 and 77. Thus, projecting ends of each of the hooks 61 and 62 are widened accordingly along a round surface of the relevant shaft portion. As a result, the hooks 61 and 62 hold the shaft portions 76 and 77 as the key 60 moves downward. Then, the once widened projecting ends of the hooks 61 and 62 return to their original states so that the hooks 61 and 62 are fitted on the shaft portions 76 and 77.

Figure 11:
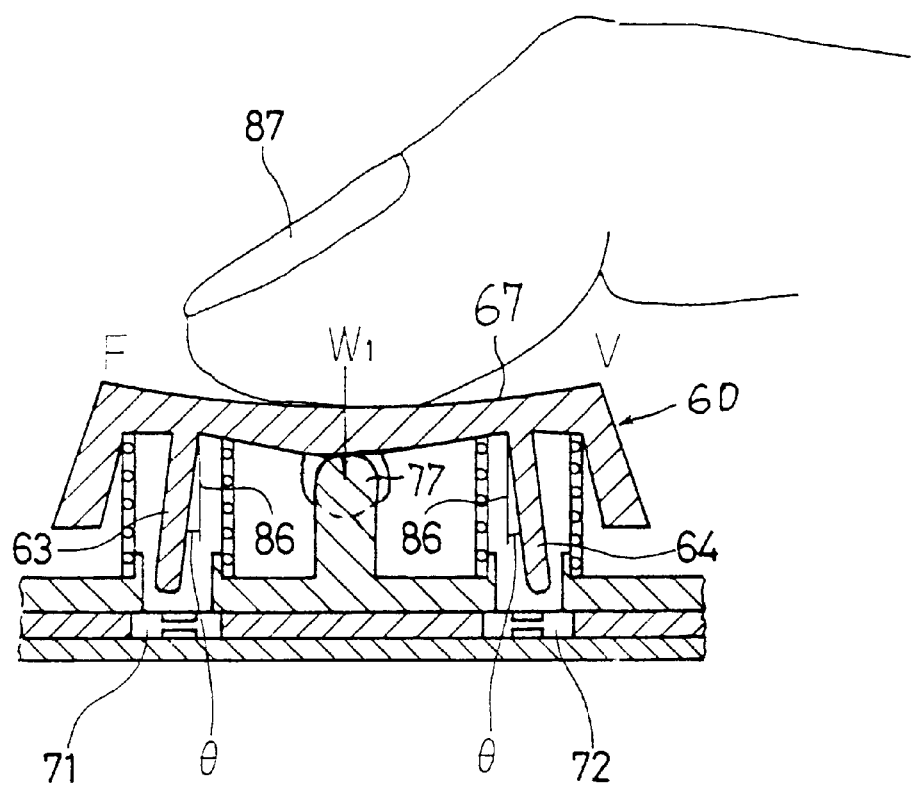
FIG. 11 shows a side elevational sectional view corresponding to the view shown in FIG. 9 where an actual key-pressing operation is being made through an operator's finger.

Operation of the above-described key 31 (60) will now be described. In the description, the key 60 is assumed to be the key $31_{-n+4}$ shown in FIG. 3 for example. That is, the key 60 is used to input either letters 'F' or 'V' printed on the top-surface portions 67a and 67b. If the operator does not intend to input information using the key 60, the key 60 lies horizontally as shown in FIG. 11 since the compression coil springs 82 and 83 press upward on opposite sides of the key 60. The horizontal position of the key 60 refers to a state in which heights of the top-surface portions 67a and 67b are the same. In this state, the two actuators 63 and 64 do not press the relevant membrane switches 71 and 72, thus do not actuate the two membrane switches 71 and 72. In this state, as shown in FIG. 11, the two actuators 63 and 64 are inclined at an angle Θ away from the vertical direction. Thus, a distance between portions of the two actuators 63 and 64 is increased as the portions move to the ends thereof.

If the operator puts his or her finger tip 87 on the center of the top surface 67, the shaft portions 76 and 77 bear a weight $W_1$ of the finger tip 87 and no rotation force is applied to the key 60. As a result, the position of the key 60 is kept horizontal and thus the two membrane switches 71 and 72 are not actuated.

Figure 12:
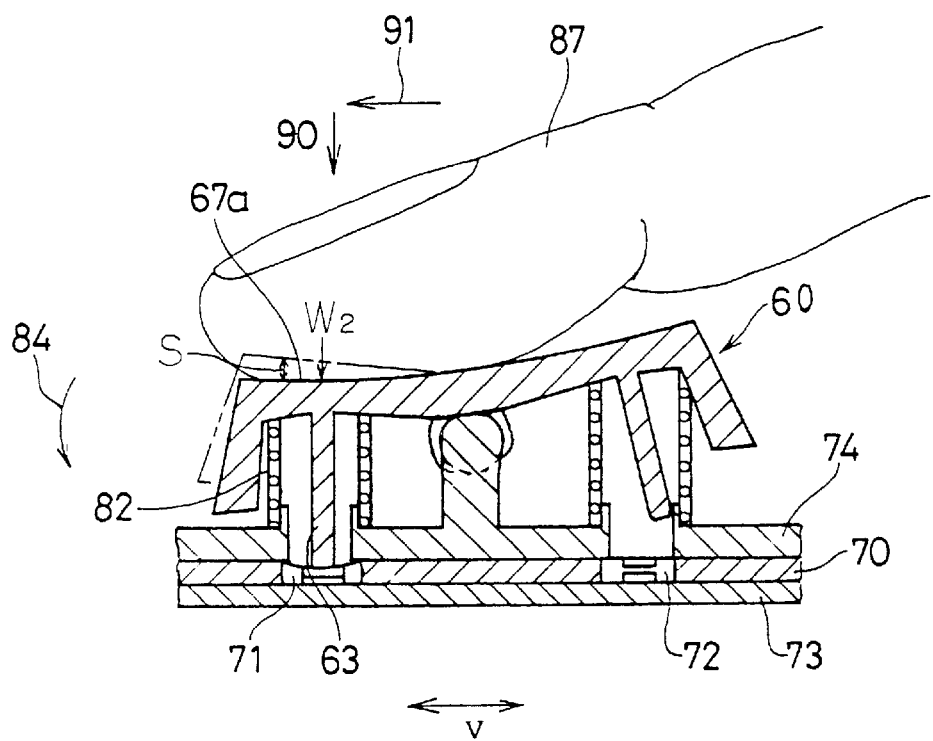
FIG. 12 shows a view corresponding to the view shown in FIG. 11 where an actual key-operation to input a letter 'F' printed on the key has been made.

If the operator intends to input the letter 'F', being printed on one end of the key 60 ($31_{-n+4}$) shown in FIG. 3, the operator may cause the finger tip 87 to move forward as shown in FIG. 12. As a result, a force $W_2$ transferred to the finger tip 87 from the body of the operator is applied to the 'F'-letter-side top-surface 67a of the key 60 as shown in the figure. Thus, the relevant compression coil spring 82 bears the force $W_2$ so that the key 60 is rotated in the direction 84 shown in the figure. As a result, the relevant actuator 63 is lowered so as to press the membrane switch 71 so as to actuate the membrane switch 71.

Figure 13:
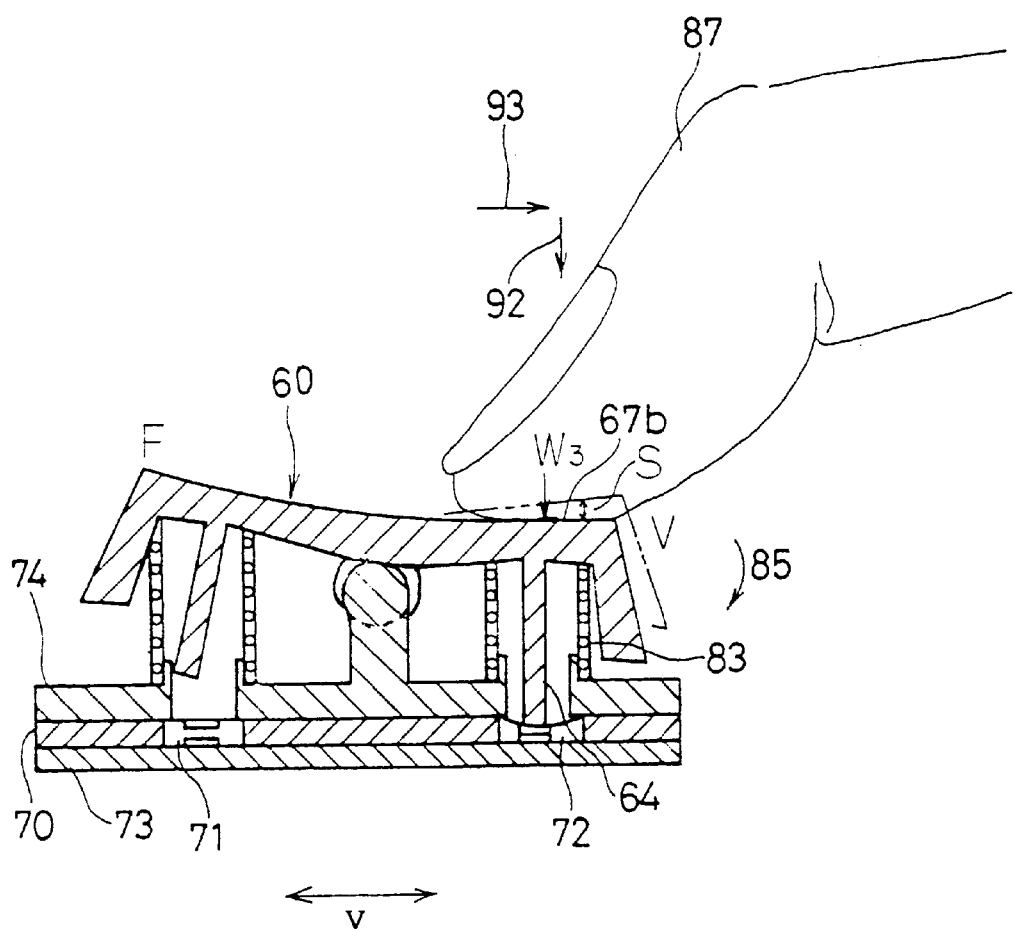
FIG. 13 shows a view corresponding to the view shown in FIG. 11 where an actual key-operation to input a letter 'V' printed on the same key has been made.

Similarly, if the operator intends to input the letter 'V', being printed on the other end of the key 60 ($31_{-n+4}$) shown in FIG. 3, the operator may cause the finger tip 87 to move backward as shown in FIG. 13. As a result, a force $W_3$ transferred to the finger tip 87 from the body of the operator is applied to the 'V'-letter-side top-surface 67b of the key 60 as shown in the figure. Thus, the relevant compression coil spring 83 bears the force $W_3$ so that the key 60 is rotated in the direction 85 shown in the figure. As a result, the relevant actuator 64 is lowered so as to press the membrane switch 72 so as to actuate the membrane switch 72.

Advantages obtainable from a key mechanism, according to the present invention, such as the key mechanism consisting of the key 31 (60) and the accompanying elements described above will now be described.

First, the key mechanism prevents accidental simultaneous actuating of the vertically adjacent switches since the two switches are actuated by a single key. In the example of the key shown in FIGS. 11, 12 and 13 for the letters 'F' and 'V', simultaneous actuating of the two membrane switches 71 and 72 for the letters 'F' and 'V' is impossible due to a seesaw structure of the key mechanism. However, with reference to FIG. 3, accidental simultaneous actuation of switches for inputting the letters 'F' and 'R' is possible since different keys are used for the two letters. However, erroneous actuation of one of the two letters may be prevented as follows. As shown in FIGS. 12 and 13, movement of a key is different in the cases where two letters printed on the key are pressed. In the example of the key for the letters 'F' and 'V', movement of the key is advancing rotation 84 thereof from the operator when the letter 'F' is pressed and the movement of the key is retreating rotation 85 to the operator when the letter 'V' is pressed. Such reverse rotation may be sensed by the operator through his or her finger tip. Thus, if the operator has pressed the letter 'R' on the key although the operator intended to press the letter 'F' on a key located just below, in FIG. 3, the key of the letter 'R', the operator may sense such reverse rotation of the key. This is because the rotation of the key of the letter 'F' being pressed is the advancing rotation and the rotation of the key of the letter 'R' being pressed is the retreating rotation. If the operator senses the erroneous pressing of the key, the operator can immediately correct the error. Thus, erroneous pressing of a key such as erroneous pressing of the letter 'R' instead of the letter 'F' may not result in particular problems.

Further, an operator may also sense when the operator has erroneously pressed two vertically adjacent letters such as the letters 'R' and 'F'. This is because the operator may simultaneously sense retreating rotation of a key and advancing rotation of another key on the same finger tip of the operator if such an erroneous operation is performed. Feeling obtained in such sensing should be a special one so that the operator may sense that the operator has performed a special operation, thus be able to find the erroneous operation being performed by the operator. If the operator finds the erroneous pressing of the key being performed by the operator, the operator can immediately correct the error. Thus, erroneous simultaneous pressing of keys such as erroneous simultaneous pressing of the letter 'R' and the letter 'F' may not result in particular problems.

Further, the pitch $P_2$ shown in FIG. 3 between horizontally adjacent keys 31 is approximately 19 mm similar to the corresponding pitch $P_2$ shown in FIG. 1 in the keyboard structure in the related art. Thus, conditions for the operator to perform erroneous pressing of a key of two horizontally adjacent keys such as the letter-'F' key and the letter-'G' key as shown in FIGS. 1 and 3 is similar for the cases where the keyboard according to the present invention and the keyboard in the related art are used.

Thus, no particular problems may result from the keyboard according to the present invention with respect to a matter about a possibility of erroneous pressing of keys in comparison to the keyboard in the related art although overall dimensions of the keyboard according to the present invention are reduced from those of the keyboard in the related art.

Further, the above-mentioned pitch $P_2$ of 19 mm, of the keyboard 30 according to the present invention, similar to that of the keyboard in the related art is sufficient for an operator to perform key-hitting (pressing) operation comfortably without unnaturally causing his or her fingers to be too close together to operate keys.

Further, the finger tip 87 moves not only downward but also horizontally in directions 91 and 93 shown in FIGS. 12 and 13 when the finger tip 87 presses the letters 'F' and 'V'0 as shown in the figures. Thus, although an available downward-movement stroke length S of the key 31 is approximately 1 mm, a finger-tip's total movement distance, due to the downward stroke length S and above-mentioned horizontal movement, when a letter of the key is pressed amounts approximately 3 mm. As a result, the operator may feel as if an actual movement stroke length of a key is elongated when the operator operates the key, thus obtaining an improved operation feeling.

Further, either top-surface portion 67a or 67b on the top surface 67 of the key 60 lies horizontally, that is, in parallel to a direction at which the housing 74 lies after the top-surface portion has been pressed by the finger tip 87. Thus, a top-surface portion is inclined first and then finally lies horizontally as it is being pressed. Such variation in a direction of a top-surface portion due to the top-surface portion being pressed may be sensed by the operator who presses the key through the finger tip put on the top-surface portion. Thus, the operator can find, through the feeling obtained through the finger tip, that the operator has completed the pressing of the key. Thus, clear operation feeling can be obtained.

Further, as shown in FIG. 11, the key 60 is not rotated if the finger tip 87 is put on the center of the top surface 67 as described above. Thus, an operator may put his or her fingers on the centers of keys, when the fingers are not required to press keys to input letters, while any remaining fingers may press the other keys. Thus, the operator may rest his or her fingers not required to press the keys.

Further, as shown in FIG. 10, the key 60 is supported by the shaft portions 76 and 77 through a wide length of the width of the key 60. Thus, the key 60 is not likely to be inclined in directions 88 and 89 in a vertical surface parallel to the horizontal direction H shown in FIG. 10. As a result, the key 60 is not likely to fluctuate in its direction when a finger tip is put on the key 60, a stable operation feeling being thus obtained.

Further, the vertical dimension $A_1$ of the keyboard 30 shown in FIG. 3 is approximately ⅔ of the corresponding dimension A of the keyboard 10 in the related art shown in FIG. 1. Accordingly an area for which an operator has to move his or her finger tips in key operation is approximately ⅔ in the vertical direction in FIG. 3 of an area required in the case where the keyboard 10 is used. Thus, key operation can be easier. Letters '1', '2', '3', . . . are printed on keys located at the top of the keyboard 10 shown in FIG. 1 and are printed on tops of keys located at the top of the keyboard 30 shown in FIG. 3. These letters, hitting of which is troublesome to the location thereof in the case of using the keyboard 10 in the related art, can be easily and thus surely hit in the case of using the keyboard 30 according to the present invention.

Structure of the key mechanism according to the present invention gives other advantages in addition to the advantages regarding operation feeling described above. As shown in FIG. 12, the actuator 63 lies perpendicular to the membrane sheet 70 when the actuator 63 presses the membrane switch 71. As shown in FIG. 13, the actuator 64 lies perpendicular to the membrane sheet 70 when the actuator 64 presses the membrane switch 72. As a result, when the actuators 63 and 64 actually press the membrane switches 71 and 72 to actuate them, no bending stresses are applied to the actuators 63 and 64 and only compression stresses are applied to them along directions of the extending axes of the actuators 63 and 64. Therefore, although the actuators 63 and 64 are rod-shaped, the actuators 63 and 64 are not likely to be damaged.

Further, the projecting ends of the actuators 63 and 64 are rounded to be referred to as rounded portions 63b and 64b. Such rounded shapes may not damage the membrane sheet 70 including the membrane switches 71 and 72.

Further, the number of keys 60 used in the keyboard 30 is approximately half of the number of keys used in the keyboard 10 in the related art as comparatively shown in FIGS. 1 and 3. As a result, a number of elements required to assemble the keyboard 30 is reduced, a number of assembling steps being thus reduced and thus the keyboard 30 being economical in comparison to the keyboard 10 in the related art.

Further, the letter arrangement printed on the keys in the keyboard 30 is similar to that in the keyboard 10 as comparatively shown in FIGS. 1 and 3. Thus, the membrane sheet 70 including the membrane switches 71 and 72 can use a membrane sheet used in the keyboard 10 in the related art only through reduction in the vertical (in FIGS. 1 and 3) dimension thereof. Thus, a completely new design is not necessary to be performed to obtain the membrane sheet 70, design of the keyboard 30 being thus simple.

Variants of a key mechanism which may be used in the keyboard 30 shown in FIG. 3 instead of the key mechanism shown in FIGS. 7, 8, 9 and 10 will now be described.

Figure 14:
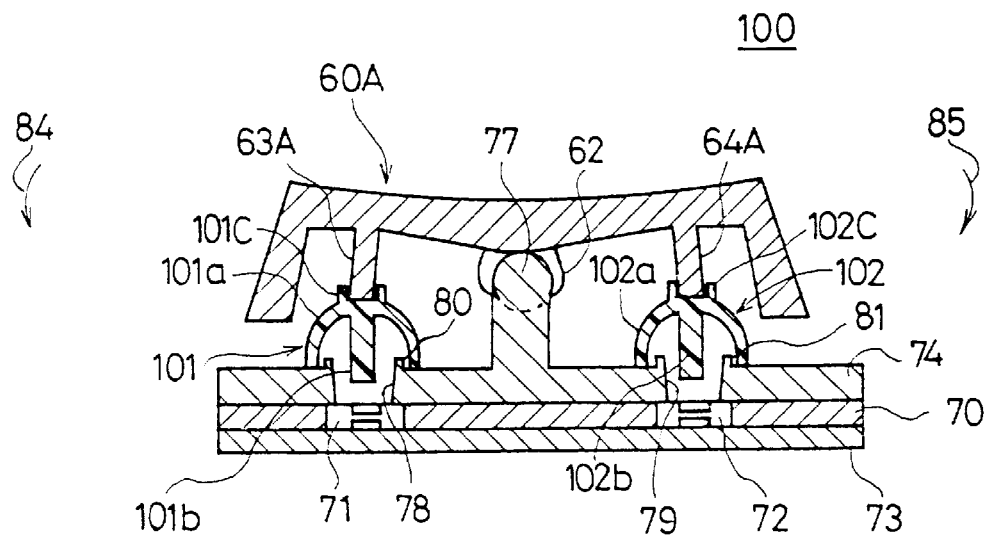
FIG. 14 shows a side elevational sectional view of a key mechanism in a first variant of the key mechanism shown in FIG. 9 according to the present invention, the view being taken similarly to taking the view shown in FIG. 9.

With reference to FIG. 14, a first variant 100 of the key mechanism will now be described. The same reference numerals are given to elements substantially identical to those used in the mechanism shown in FIG. 9 and a description thereof is omitted. The key mechanism 100 uses dome rubbers 101 and 102 instead of the compression coil springs 82 and 83 used in the mechanism shown in FIG. 9. The dome rubbers 101 and 102 include domed portions 101a and 102a; projections 101b and 102b; and bearing portions 101c and 102c. Each of the domed portions 101a and 102a buckles if a predetermined strength of force is applied thereto. The projections 101b and 102b project from centers of inner walls of the domed portions 101a and 102a. The bearing portions 101c and 102c project from centers of outer walls of the domed portions 101a and 102a oppositely to the projections 101b and 102b. Edges of the domed portions 101a and 102a are fitted outside of the collars 80 and 81 provided on the housing 74 so as to cover the openings 78 and 79 formed in the housing, the dome rubbers 101 and 102 being set on the housing 74.

Actuators 63A and 64A downwardly projecting from the rear wall of the key 60A similarly to the mechanism shown in FIG. 9 are shorter than the actuators 63 and 64 shown in FIG. 9. The key 60A is rotatively supported on the housing 74 through the shaft portions 76 and 77, similarly to the mechanism shown in FIG. 9. The actuators 63A and 64A are in contact with the bearing portions 101c and 102c as shown in FIG. 14.

Key operations to be performed on the key mechanism 100 are similar to those for the mechanism shown in FIGS. 7–10 described above. Instead of the shortening of the compression coil springs 82 and 83 in the mechanism of FIGS. 7–10, the domed portions 101a and 102a buckle to allow the top-surface portions 67a and 67b to be lowered. In particular, use of the domed portions 101a and 102a gives the operator an appropriate clicking feeling. When the operator presses the key 60A causing the domed portions 101a and 102a to buckle, the clicking feeling is felt through a finger tip of the operator. Such clicking feeling provides improved operation feeling even if a key-movement stroke is short.

Further, the actuators 63A and 64A press the membrane switches 71 and 72 in the membrane sheet 70 via the dome rubbers 101 and 102, in particular the bearing portions 101c and 102c; the center portions of the domed portions 101a and 102a; and the projections 101b and 102b. Direct pressing by means of the rubber-made members such as the domed rubbers 101 and 102 is not likely to damage the membrane sheet 70.

Figure 15:
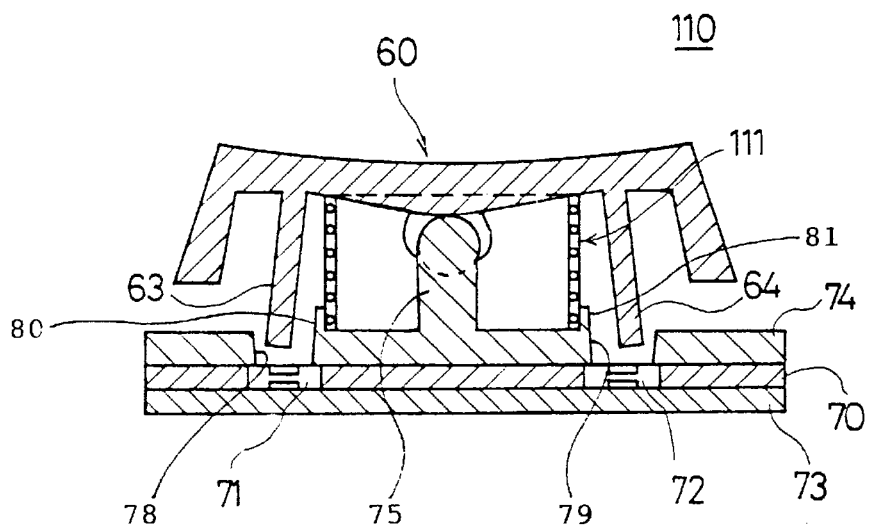
FIG. 15 shows a side elevational sectional view of a key mechanism in a second variant of the key mechanism shown in FIG. 9 according to the present invention, the view being taken similarly to taking the view shown in FIG. 9.

With reference to FIG. 15, a second variant 110 of the key mechanism will now be described. The same reference numerals are given to elements substantially identical to those used in the mechanism shown in FIG. 9 and a description thereof is omitted. The key mechanism 110 uses a large-diameter compression coil spring 111 instead of the compression coil springs 82 and 83 used in the mechanism shown in FIG. 9. As shown in FIG. 15, the coil spring 111 surrounds the column 75, is inserted between edges of the collars 80 and 81 formed on the housing 74 and is inserted between the rear wall of the key 60 and the housing 74. As shown in the figure, provision of the collars 80 and 81 is not needed and thus is omitted at outer sides of the openings 78 and 79.

In the structure of the key mechanism shown in FIG. 9, an unbalanced variation of the compression coil springs 82 and 83 in their properties may vary a direction of the key 60 where an operator does not apply any force to the key 60. Such direction variation in the keys 31 may degrade appearance of the keyboard 30. On the other hand, since the key mechanism 110 shown in FIG. 15 uses the single coil spring 111, the horizontal direction of the key 60 is always ensured.

Further, the present invention is not limited to the above described embodiments, and variations and modifications may be made without departing from the scope of the present invention.

What is claimed is:

1. A keyboard comprising:

a plurality of keys, each key having a character illustrated at each end, and each key having an elongated shape elongated in a first direction, said plurality of keys being aligned along a second direction different from said first direction, thereby forming a plurality of horizontal rows of characters along said second direction; and first and second mutually different electric contacts provided for each key of said plurality of keys in respective, mutually different locations, said key selectively establishing one of said two electrical contacts as a result of being pressed appropriately, wherein a front surface of each key of said plurality of keys is parallelogram in shape, wherein said first and second directions form an angle other than 90°, wherein each of said parallelogram-shaped keys has a longitudinal axis thereof extending along said first direction, said first and second mutually different electric contacts being located beneath two respective ends of each said key along said longitudinal axis thereof, and wherein said characters illustrated at the respective ends of each said key lie in different ones of the horizontal rows of characters.

2. The keyboard according to claim 1, wherein each key of said plurality of keys has a width in said second direction falling in a range between 14 and 18 mm and a length in said first direction, said length being larger than said width but smaller than twice said width.

3. The keyboard according to claim 1, wherein:

each key of said plurality of keys carries two different key letters present on a front surface thereof at respective ends of said key; and each key of said plurality of keys establishes electric contact if a first end of said key is pressed and establishes another electric contact if a second end of said key is pressed.

4. The keyboard according to claim 3, wherein said plurality of keys are arranged so that the key letters present on said plurality of keys are arranged in a standard arrangement.

5. The keyboard according to claim 4, wherein:

the parallelograms of said plurality of keys are identical to one another;

said first direction is parallel to two long parallel sides of each key of said plurality of keys; and said plurality of keys are arranged so that one side of the two long parallel sides of a first key faces one side of the two long parallel sides of a second key, a first side of two short parallel sides of said first key is aligned with a first side of the two short parallel sides of said second key, and a second side of said two short parallel sides of said first key is aligned with a second side of said two short parallel sides of said second key.

6. The keyboard according to claim 1, further comprising:

a fulcrum provided for each key of said plurality of keys to cause said key to tilt about said fulcrum, the selective establishment of the two different electric contacts being made by the tilting motion; and a returning spring provided for each key of said plurality of keys, said returning spring controlling the tilting motion of said key so that said key tilts from a predetermined, reference state to a tilted state as a result of being pressed and so that said key returns from said tilted state to said predetermined, reference state as a result of the pressing force applied to said key being removed.

7. The keyboard according to claim 6, wherein:

said fulcrum supports each key of said plurality of keys at a middle position of said key so that said key can tilt about said fulcrum in a way in which first and second ends along said first direction of said key selectively retreat; and said returning spring comprises an elastic member elastically deforming in response to the tilting motion of each key of said plurality of keys and causing an action to return said key to said predetermined, reference state when the pressing force applied to said key is removed, by exerting an elastic force corresponding to a force applied by said key when said key is pressed.

8. The keyboard according to claim 7, wherein said elastic member comprises a compression coil spring.

9. The keyboard according to claim 8, wherein each key of said plurality of keys includes first and second compression springs as said returning spring in correspondence to said first and second electric contacts.

10. The keyboard according to claim 8, wherein each key of said plurality of keys includes a single compression coil spring as said returning spring, the compression coil spring being disposed so that a coil of said compression coil spring surrounds said fulcrum.

11. The keyboard according to claim 7, wherein:

each key of said plurality of keys includes two returning springs, said elastic member of each of said returning springs comprises a rubber spring and a projection; and said rubber spring causes an elastic deformation upon pressing of said key, and said projection establishing a relevant electric contact of the electric contacts belonging to said key in response to said elastic deformation of said rubber spring.

12. The keyboard according to claim 1, wherein each key of said plurality of keys has a front surface shaped so as to cause an end portion of said front surface to lie generally in parallel to a surface of said keyboard after said key has tilted as a result of said end portion of said front surface being pressed, said surface of said keyboard being a surface on which said plurality of keys are arranged.

13. The keyboard according to claim 1, further comprising two actuating members provided for each key of said plurality of keys;

and wherein:

pressing of said key applies a pressing force to either actuating member of said two actuating members so that said actuating member establishes a relevant electric contacts of the electric contacts belonging to said key; and said pressing force has a direction along a direction of a longitudinal axis of said actuating member at a time said actuating member has established said relevant electric contact.

14. A keyboard comprising:

a plurality of keys, each key of said plurality of keys having an elongated shape elongated in a first direction, said plurality of keys being aligned along a second direction different from said first direction; and first and second mutually different electric contacts provided for each key of said plurality of keys in respective, mutually different locations, said key selectively establishing one of said two electrical contacts as a result of being pressed appropriately, wherein a top surface of each key of said plurality of keys has a substantially flat central portion and a peripheral portion that gradually curves upward from said substantially flat central portion to edges thereof in both said first direction and said second direction.

15. A keyboard comprising:

a plurality of keys, each key having a character illustrated at each end, and each key having an end to be pressed and having an elongated shape elongated in a first direction, said plurality of keys being aligned along a second direction different from said first direction, thereby forming a plurality of horizontal rows of characters along said second direction; and first and second mutually different electric contacts provided for each key of said plurality of keys in respective, mutually different locations, said key selectively establishing one of said two electrical contacts as a result of being pressed appropriately, wherein each key of said plurality of keys has two actuators each projecting from a rear surface of said key, in response to said end of said key being pressed, a projecting direction of a respective actuator being perpendicular to a surface of a switch, said surface of said switch being thus pressed by a projecting end of said actuator, and thereby said switch establishing a respective electrical contact, wherein each of said actuators has a length which is longer than a length of a sidewall of said key, wherein an upper portion of said actuator proximate said rear surface of said key is located within a respective compression coil spring, and wherein said characters illustrated at the respective ends of each said key lie in different ones of the horizontal rows of characters.

16. A keyboard comprising:

a plurality of keys, each key having a character illustrated at each end, and each key having an end to be pressed and having an elongated shape elongated in a first direction, said plurality of keys being aligned along a second direction different from said first direction, thereby forming a plurality of horizontal rows of characters along said second direction; and first and second mutually different electric contacts provided for each key of said plurality of keys in respective, mutually different locations, said key selectively establishing one of said two electrical contacts as a result of being pressed appropriately, wherein each key of said plurality of keys comprises:

two dome-shaped rubbers located in a rear of said key, each provided with a rubber actuator projecting from a rear surface thereof, and two key actuators each projecting from a rear surface of said key, in response to said end of said key being pressed, a projecting end of a respective key actuator which extends from a rear surface of said key pressing a front surface of a respective dome-shaped rubber to: (a) thereby deform said dome-shaped rubber, (b) thereby have a respective rubber actuator integrally extending from a bottom surface of said dome-shaped rubber press a surface of a switch, and (c) thereby have said switch establish a respective electrical contact, and wherein said characters illustrated at the respective ends of each said key lie in different ones of the horizontal rows of characters.

* * * * *